United States Patent [19]
Diehl et al.

[11] Patent Number: 5,213,956
[45] Date of Patent: May 25, 1993

[54] SOLID PARTICLE DISPERSIONS OF FILTER DYES FOR PHOTOGRAPHIC ELEMENTS

[75] Inventors: Donald R. Diehl; Glenn M. Brown; Margaret J. Helber, all of Rochester, N.Y.

[73] Assignee: Eastman Kodak Company, Rochester, N.Y.

[21] Appl. No.: 733,929

[22] Filed: Jul. 22, 1991

[51] Int. Cl.$^5$ .............................................. G03C 1/815
[52] U.S. Cl. .................................................... 430/522
[58] Field of Search ............... 430/522, 507, 510, 517, 430/584, 585

[56] References Cited

U.S. PATENT DOCUMENTS

| | | | |
|---|---|---|---|
| 2,926,187 | 2/1960 | Melby | 260/465 |
| 4,803,150 | 2/1989 | Dickerson et al. | 430/502 |
| 4,855,221 | 8/1989 | Factor et al. | 430/510 |
| 4,857,446 | 8/1989 | Diehl et al. | 430/510 |
| 4,861,700 | 8/1989 | Shuttleworth et al. | 430/517 |
| 4,900,652 | 2/1990 | Dickerson et al. | 430/502 |
| 4,900,653 | 2/1990 | Factor et al. | 430/522 |
| 4,923,788 | 5/1990 | Shuttleworth et al. | 430/507 |
| 4,940,654 | 7/1990 | Diehl et al. | 430/522 |
| 4,948,717 | 8/1990 | Diehl et al. | 430/510 |
| 4,948,718 | 9/1990 | Factor et al. | 430/522 |
| 4,950,586 | 8/1990 | Diehl et al. | 430/507 |
| 4,952,553 | 8/1990 | Kanto et al. | 503/227 |
| 4,988,611 | 1/1991 | Anderson et al. | 430/494 |

FOREIGN PATENT DOCUMENTS

| | | |
|---|---|---|
| 0294099 | 5/1988 | European Pat. Off. |
| 0391405 | 10/1990 | European Pat. Off. |
| 226555 | 11/1985 | Japan |
| 103862 | 5/1986 | Japan |
| 281156 | 12/1986 | Japan |
| 862443 | 3/1961 | United Kingdom |

OTHER PUBLICATIONS

Hennig et al., Z. Chem., 29, 168 (1989).
Chemical Abstract 130793r, vol. 109, No. 16, 17 Oct. 1988.

*Primary Examiner*—Jack P. Brammer
*Attorney, Agent, or Firm*—Gordon M. Stewart

[57] ABSTRACT

Solid particle dispersions of dyes according to the formula:

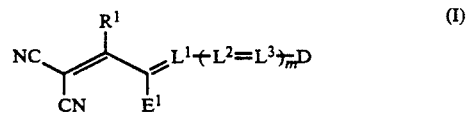

wherein D is selected from the group consisting of

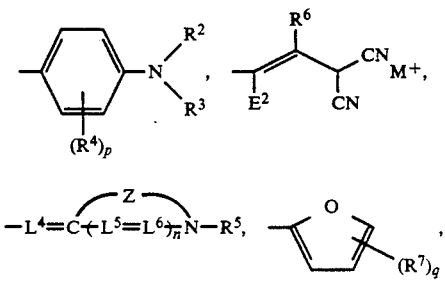

and ketomethylene nuclei are disclosed as filter dyes for photographic elements.

In this formula, $E^1$ and $E^2$ are each independently electron withdrawing groups $R^1$ and $R^6$ are each independently R or NHR, where R is substituted or unsubstituted aryl. $R^2$ and $R^3$ are each independently substituted or unsubstituted alkyl or substituted or unsubstituted aryl, or represent the carbon atoms necessary to form a fused ring with the phenyl ring to which the N atom is attached. $R^4$ and $R^7$ are each independently hydrogen, substituted or unsubstituted alkyl or substituted or unsubstituted aryl. $R^5$ is substituted or unsubstituted alkyl Z represents the atoms necessary to complete a substituted or unsubstituted 5 or 6 membered heterocyclic nucleus. $M^+$ is a cation. $L^1$ through $L^7$ are each independently substituted or unsubstituted methine groups. m is 0, 1, 2, or 3. n is 0 or 1. p is 0, 1, 2, 3, or 4. q is 0, 1, 2, or 3. At least one of $R^1$ or D includes an aryl ring substituted with a carboxy or sulfonamido substituent.

11 Claims, No Drawings

SOLID PARTICLE DISPERSIONS OF FILTER DYES FOR PHOTOGRAPHIC ELEMENTS

This invention relates to dyes, particularly dyes useful as filter dyes, especially in photographic elements.

Photographic materials often contain filter dyes to absorb light from different regions of the spectrum, such as red, blue, green, ultraviolet, and infrared, to name a few. These filter dyes are often required to perform the function of absorbing light during exposure of the material so as to prevent or at least inhibit light of a region of the spectrum from reaching at least one of the radiation-sensitive layers of the element.

After processing of the element, however, the continued presence of the filter dye will adversely affect the image quality of the photographic material. It is therefore desirable to use filter dyes that will be solubilized and removed or at least decolorized during photographic processing. Dyes that are easily solubilized, however, tend to wander throughout the photographic material during coating, adversely affecting the final image quality.

To prevent dye wandering, the dyes are often coated with a mordant to bind the dye in the layer in which it is coated. Dye mordants, while often useful, tend to either bind the dye too strongly, inhibiting solubilization of the dye during photographic processing, or too weakly, thus not preventing dye wandering.

It would therefore be highly desirable to provide a filter dye for use in photographic elements that does not wander during coating without requiring a mordant, and which is fully solubilized during processing for decolorizing and/or removal. It would be further desirable to provide filter dyes which in addition to the above also exhibit high covering power such that lower amounts of dye can be used, which would be advantageous for environmental concerns.

U.S. Pat. Nos. 4,950,586, 4,948,718, 4,948,717, 4,940,654, 4,923,788, 4,900,653, 4,861,700, 4,857,446, and 4,855,221 disclose the use of various dyes in solid particle dispersions. These patents disclose that the use of solid particle dye dispersions allows for the coating of filter dyes which are immobile in coated acidic emulsion layers yet which can be fully removed during basic aqueous film or paper processing. The specific dyes of the present invention are not disclosed.

U.S. Pat. Nos. 2,926,187 and 4,952,553, Japanese Kokai Nos 61-281156, 61-103862, and 60-226555, and L. Hennig et al., Z. Chem., 29, 168 (1989) disclose dyes similar to those of the present invention. The specific dyes of the invention are not disclosed, however, and there is no suggestion of the use of such dyes in silver halide photographic elements.

According to the invention, there is provided a photographic element having a layer comprising a hydrophilic binder and, as a filter dye, a solid particle dispersion of a compound having the formula

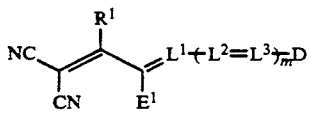

(I)

wherein: D is selected from the group consisting of

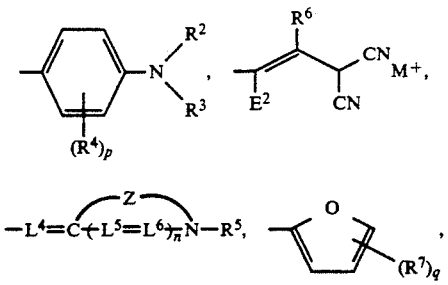

and ketomethylene nuclei;

$E^1$ and $E^2$ are each independently electron withdrawing groups;

$R^1$ and $R^6$ are each independently R or NHR, where R is substituted or unsubstituted aryl;

$R^2$ and $R^3$ are each independently substituted or unsubstituted alkyl or substituted or unsubstituted aryl, or represent the carbon atoms necessary to form a fused ring with the phenyl ring to which the N atom is attached;

$R^4$ and $R^7$ are each independently hydrogen, substituted or unsubstituted alkyl or substituted or unsubstituted aryl;

$R^5$ is substituted or unsubstituted alkyl;

Z represents the atoms necessary to complete a substituted or unsubstituted 5 or 6 membered heterocyclic nucleus;

$M^+$ is a cation;

$L^1$ through $L^7$ are each independently substituted or unsubstituted methine groups;

m is 0, 1, 2, or 3; n is 0 or 1; p is 0, 1, 2, 3, or 4; q is 0, 1, 2, or 3;

at least one of $R^1$ or D comprising an aryl ring substituted with a carboxy or sulfonamido substituent.

Solid particle dispersions of the compound of formula (I) are useful as general purpose filter dyes, alone or in combination with other filter dyes in photographic elements. They are insoluble at coating pH's of 6 or less (generally 4 to 6) and soluble at processing pH's of 8 or more (generally 8 to 12), so that they do not interact with other components of the photographic element, yet still are fully solubilized during photographic processing.

A particular advantage of the dyes of the invention is that they provide higher covering power at their coating λmax than comparable known solid particle dispersion dyes. This advantage is particularly important in modern film formats and processing conditions, as filter dyes with a high covering power need not be coated at as high a coverage as dyes with lower covering power in order to achieve the same degree of light filtration. In addition to reducing manufacturing costs, lower levels of coated dyes will reduce the level of organic dye build up in processing solutions, and the resulting lower levels of dissolved dyes removed from processed photographic elements will have a reduced environmental impact.

A further advantage of dyes of the invention is that they generally possess deeper λmax values than comparable known filter dyes. This may be particularly advantageous where dyes absorbing infrared light are desired.

According to formula (I), $E^1$ and $E^2$ are each electron withdrawing groups. Electron withdrawing groups in organic compounds are well-known in the art, such as described in J. Marsh, Advanced Organic Chemistry, 3rd Ed., p.238, the disclosure of which is incorporated herein by reference in its entirety Examples of such groups include cyano, acyl, aminocarbonyl, and alkoxycarbonyl.

In a preferred embodiment, $E^1$ and $E^2$ are cyano.

$R^2$ and $R^3$ can be substituted or unsubstituted alkyl or substituted or unsubstituted aryl. Preferably, these groups are each independently substituted or unsubstituted alkyl of 1 to 6 carbon atoms or substituted or unsubstituted aryl of 6 to 14 carbon atoms. The alkyl or aryl group may be substituted with any of a number of substituents as is known in the art, other than those, such as sulfo substituents, that would tend to increase the solubility of the dye so much as to cause it to become soluble at coating pH's. Examples of useful substituents include halogen, alkoxy, ester groups, amido, acyl, alkylamino, carboxy, and sulfonamido. Examples of alkyl groups include methyl, ethyl, n-propyl, isopropyl, n-butyl, isobutyl, n-pentyl, n-hexyl, or isohexyl. Examples of aryl groups include phenyl, naphthyl, anthracenyl, pyridyl, and styryl.

R can be substituted or unsubstituted aryl, preferably of from 6 to 14 carbon atoms. Examples of aryl groups include phenyl, naphthyl, anthracenyl, pyridyl, and styryl. Useful substituents include those listed above for $R^2$ and $R^3$.

$R^4$ and $R^7$ are each independently hydrogen, substituted or unsubstituted alkyl, preferably from 1 to 6 carbon atoms, or substituted or unsubstituted aryl, preferably from 6 to 14 carbon atoms. Examples of $R^4$ and $R^7$ include methyl, ethyl, propyl, butyl, isopropyl, t-butyl, tolyl, and phenyl Useful substituents include those listed above for $R^2$ and $R^3$.

$R^5$ is substituted or unsubtituted alkyl, preferably of from 1 to 15 carbon atoms. Examples of $R^5$ include methyl, ethyl, propyl, methoxyethyl, benzyl, and carboxybenzyl Additional useful substituents include those listed above for $R^2$ and $R^3$.

Z represents the atoms necessary to complete a substituted or unsubstituted 5 or 6 membered heterocyclic nucleus. The heterocyclic nucleus is of the type commonly used in cyanine dyes, and is well-known in the art. They are described, for example, in "*The Cyanine Dyes and Related Compounds*", Frances Hamer, Interscience Publishers, 1964, the disclosure of which is incorporated by reference. Examples of such heterocyclic nuclei include thiazole, selenazole, oxazole, imidazole, indole, benzothiazole, benzoselenazole, benzoxazole, benzimidazole, benzindole, naphthothiazole, naphthoselenazole, naphthoxazole, and naphthimidazole. The nucleus may be substituted with known substituents, such as substituted or unsubstituted alkyl of from 1 to 10 carbon atoms (e.g., methyl, ethyl, 3-chloropropyl),alkoxy of from 1 to 8 carbon atoms (e.g., methoxy, ethoxy), halogen (e.g., chloro, fluoro), substituted or unsubstituted aryl of from 6 to 20 carbon atoms (e.g., phenyl), or with carbon atoms forming a fused ring system (e.g. in a benzothiazole or a naphthothiazole nucleus) In a preferred embodiment, Z represents the atoms necessary to complete a substituted or unsubstituted benzoxazole nucleus.

$M^+$ is a cation such as $Et_3NH^+$, $Na^+$, $K^+$.

Ketomethylene nuclei are a well-known class of chemical groups as described, for example, in the above referenced Hamer, The Cyanine Dyes and Related Compounds, pp. 469-494, 595-604 (1964). Examples of preferred ketomethylene residues include benzoyl acetonitrile, 2-pyrazolin-5-one, pyrazolindione, barbituric acid nuclei, rhodanine, indanedione, isoxazolinone, benzofuranone, chromandione, cyclohexanedione, dioxanedione, furanone, isoxazolidindione, pyrandione, and pyrrolinone.

$L^1$ through $L^7$ are substituted or unsubstituted methine groups, e.g. $-CR^8=$ groups, where $R^8$ represents hydrogen or substituted or unsubstituted alkyl or substituted or unsubstituted aryl as described above for $R^2$ and $R^3$.

Dyes of formula I include at least one carboxy or sulfonamido substituent. Carboxy groups have the formula $-CO_2H$ and sulfonamido groups have the formula $-NHSO_2R^9$ where $R^9$ is substituted or unsubstituted alkyl or substituted or unsubstituted aryl as described above for $R^2$ and $R^3$.

Examples of dyes according to formula (I) include the following:

1-4)

| Dye | $R_1$ | m | Solution λ-max nm | ε (× $10^4$) |
|-----|-------|---|-------------------|--------------|
| 1 | $NHSO_2CH_3$ | 0 | 514$^a$ | 5.20 |
| 2 | $CO_2H$ | 0 | 517$^b$ | 4.56 |
| 3 | $NHSO_2CH_3$ | 1 | 590$^a$ | 5.93 |
| 4 | $CO_2H$ | 1 | 608$^a$ | 6.60 |

$^a$($CH_3CN$)
$^b$(MeOH + $Et_3N$)

5-8)

| Dye | $R_1, R_2$ | m | Solution λ-max nm (MeOH) | ε (× $10^4$) |
|-----|------------|---|--------------------------|--------------|
| 5 | $NHSO_2CH_3$ | 0 | 509 | 7.20 |
| 6 | $CO_2H$ | 0 | 505 | 6.63 |
| 7 | $CO_2H$ | 1 | 615 | 14.3 |
| 8 | $NHSO_2CH_3$ | 1 | 616 | 10.1 |

9)

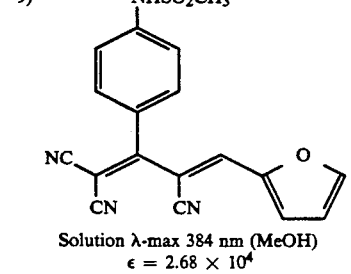

Solution λ-max 384 nm (MeOH)
ε = 2.68 × $10^4$

10)

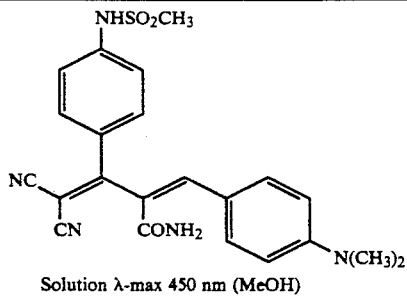

Solution λ-max 450 nm (MeOH)

11)

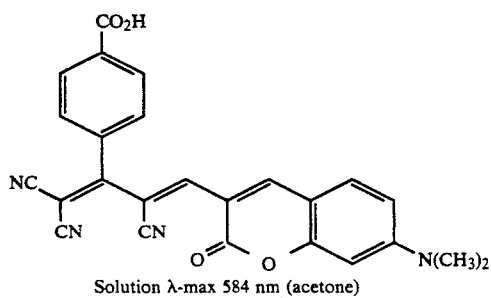

Solution λ-max 584 nm (acetone)
$\epsilon = 5.89 \times 10^4$ 12-27)

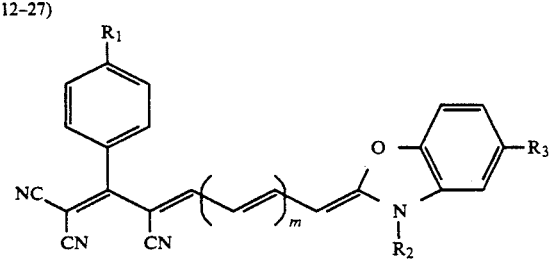

| Dye | $R_1$ | $R_2$ | $R_3$ | m | Solution λ-max nm (MeOH) |
|---|---|---|---|---|---|
| 12 | H | $C_2H_5$ | $NHSO_2CH_3$ | 0 | 492 |
| 13 | H | $C_2H_5$ | $NHSO_2CH_3$ | 1 | 598 |
| 14 | H | 4-carboxy benzyl | H | 0 | 497* |
| 15 | H | 4-carboxy benzyl | H | 1 | 595 |
| 16 | H | $CH_3$ | $CO_2H$ | 0 | 495 |
| 17 | H | $CH_3$ | $CO_2H$ | 1 | 592 |
| 18 | $NHSO_2CH_3$ | $C_2H_5$ | H | 0 | 495 |
| 19 | $NHSO_2CH_3$ | $C_2H_5$ | H | 1 | 594 |
| 20 | $NHSO_2CH_3$ | $CH_3$ | $NHSO_2CH_3$ | 0 | 494 |
| 21 | $NHSO_2CH_3$ | $CH_3$ | $NHSO_2CH_3$ | 1 | 604 |
| 22 | $NHSO_2CH_3$ | $CH_3$ | $CO_2H$ | 0 | 496 |
| 23 | $NHSO_2CH_3$ | $CH_3$ | $CO_2H$ | 1 | 595 |
| 24 | $CO_2H$ | $CH_3$ | $CO_2H$ | 0 | 495 |
| 25 | $CO_2H$ | $C_2H_5$ | H | 1 | 578 |
| 26 | $CO_2H$ | 4-carboxy benzyl | H | 1 | 594 |
| 27 | $NHSO_2CH_3$ | 4-carboxy benzyl | H | 1 | 598 |

*MeOH + Et₃N solution

28)

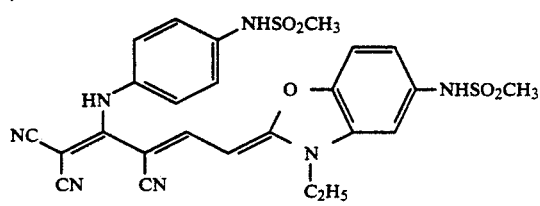

29)

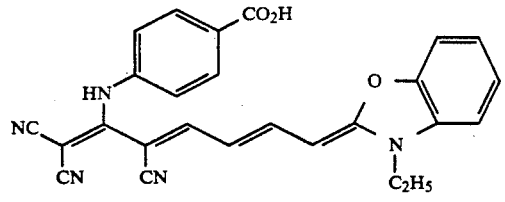

30)

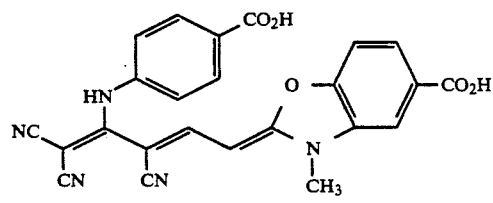

31)

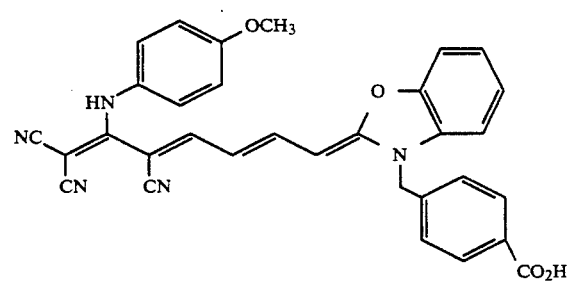

32)

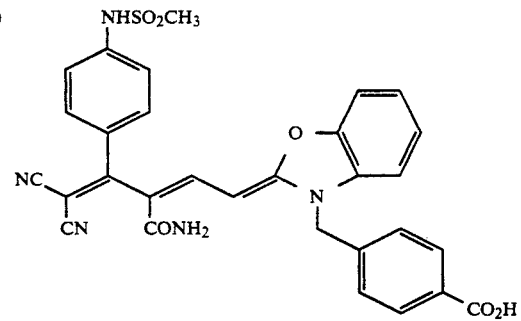

33)

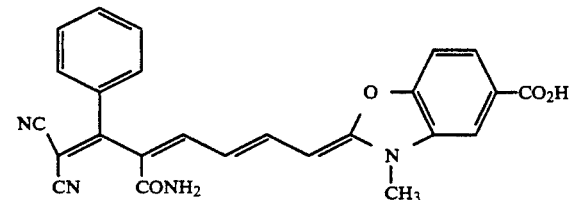

34)

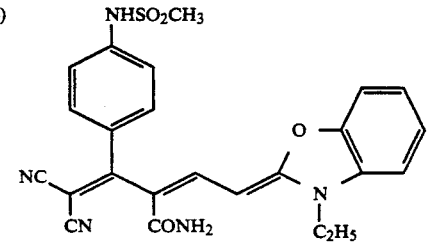

-continued
35) 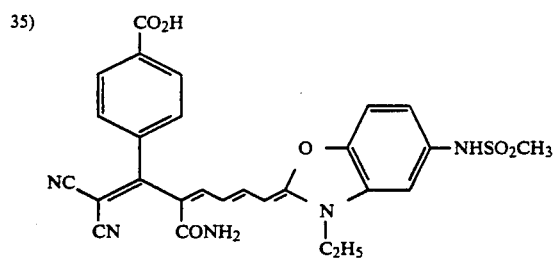
36) 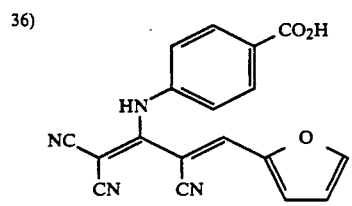
37) 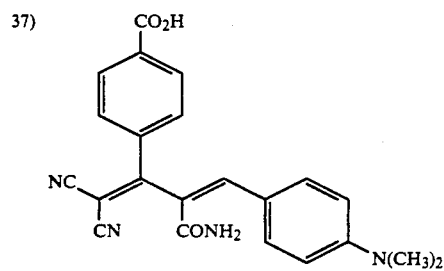
38) 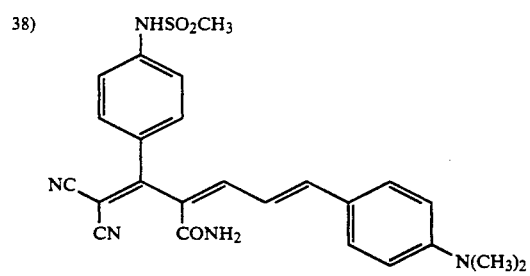
39) 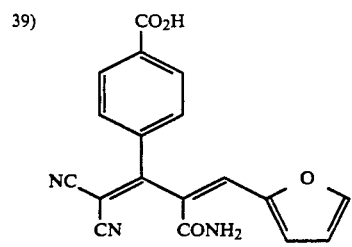
40) 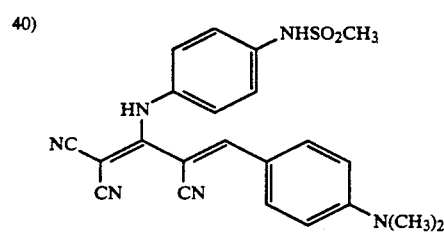
-continued
41) 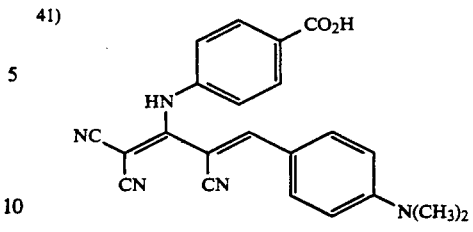
42) 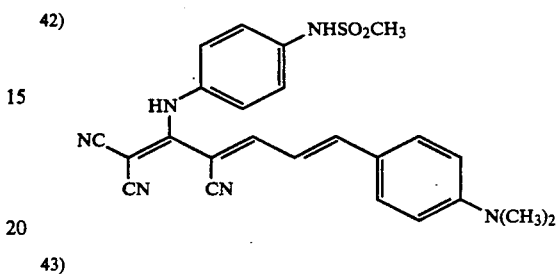
43) 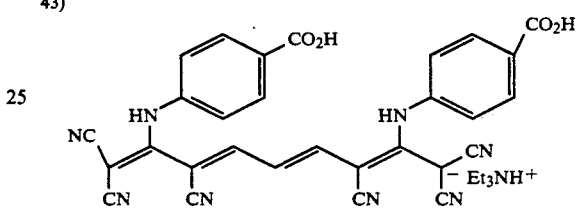
44) 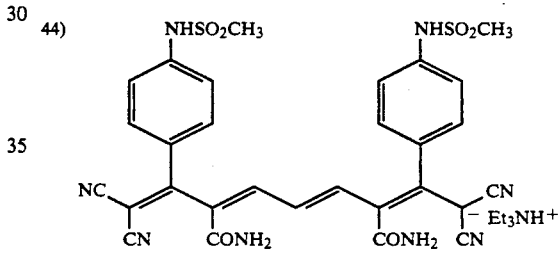
45) 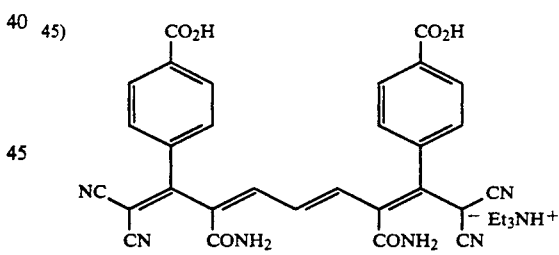
46) 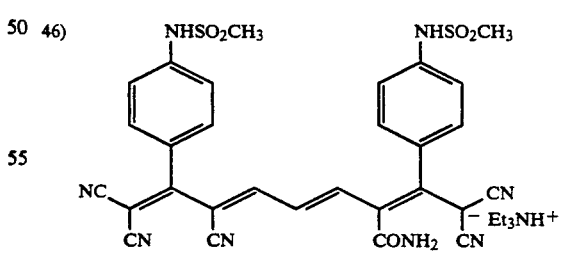
47) 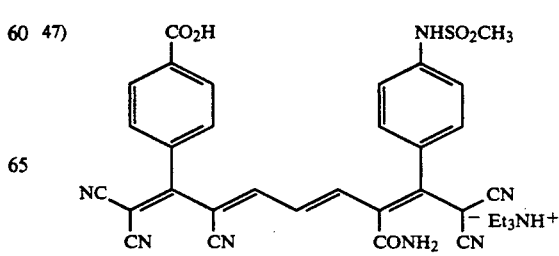

-continued

48) 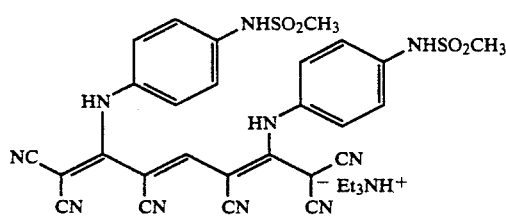

49) 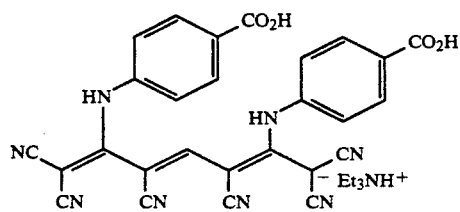

50) 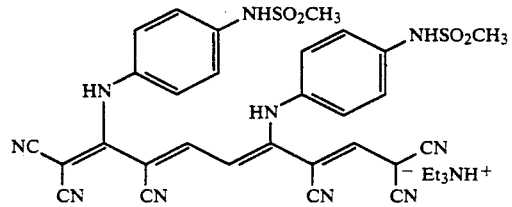

51) 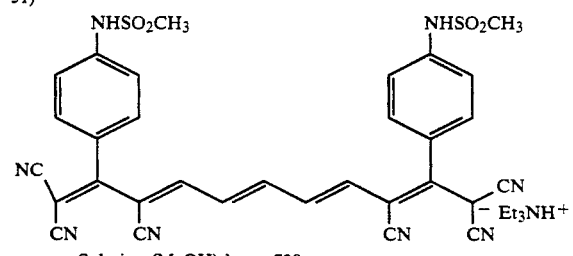
Solution (MeOH) λmax 720 nm

52) 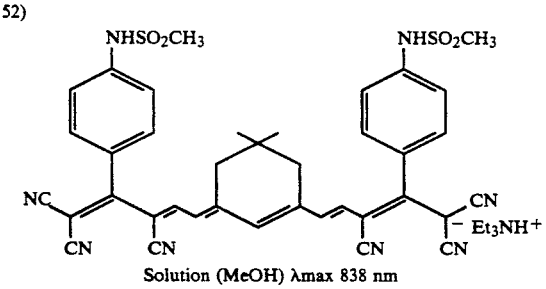
Solution (MeOH) λmax 838 nm

53) 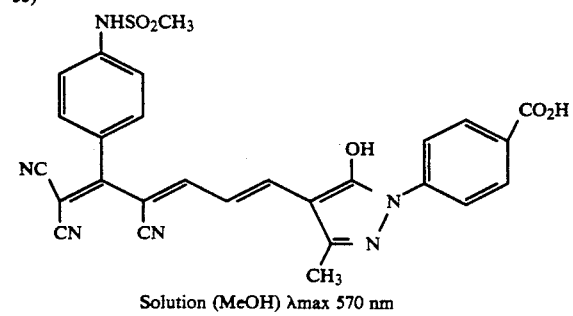
Solution (MeOH) λmax 570 nm

-continued

54) 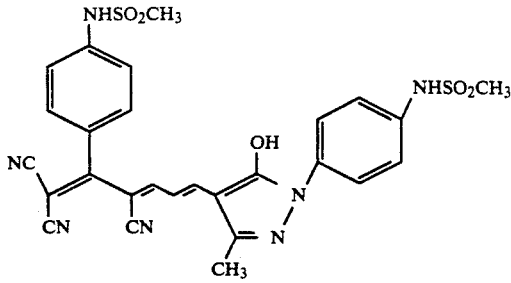
Solution (MeOH) λmax 568 nm

55) 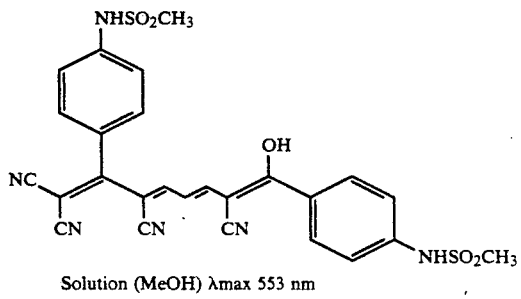
Solution (MeOH) λmax 553 nm

56) 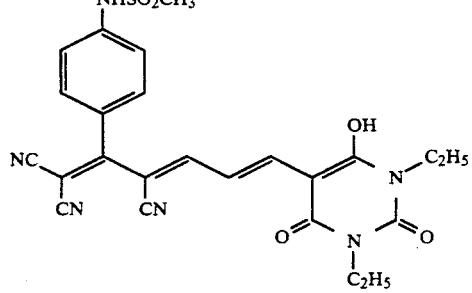
Solution (MeOH) λmax 552 nm

The dyes of formula (I) can be prepared by synthetic techniques well-known in the art, as illustrated by the synthetic examples below. Such techniques are further illustrated, for example, in "*The Cyanine Dyes and Related Compounds*", Frances Hamer, Interscience Publishers, 1964.

The dyes of formula (I) may be incorporated in a hydrophilic layer of a photographic element in any known way (e.g., with the aid of a high-boiling nonpolar organic solvent), but are preferably in the form of a solid particle dispersion (i.e., the dye is in the form of solid particles of microscopic size) for incorporation into a layer such as a hydrophilic colloid layer of a photographic element. The solid particle dispersion can be formed by precipitating the dye in the form of a dispersion and/or by well-known milling techniques, e.g., ball-milling, sand-milling, or colloid-milling (preferably ball- milling or sand-milling) the dye in the presence of a dispersing agent. The dispersion of dye particles should have a mean diameter of less than 10 μm and preferably less than 1 μm. The dye particles can be prepared in sizes ranging down to about 0.01 μm.

The dyes may be located in any layer of the element where it is desirable to absorb light, but it is particularly advantageous to locate them in a layer where they will be solubilized and washed out during processing. Useful amounts of dye range from 1 to 1000 mg/m². The dye should be present in an amount sufficient to yield an optical density at the absorbance D-max in the visible region before processing of at least 0.10 density units and preferably at least 0.50 density units. This optical density will generally be less than 5.0 density units for most photographic applications.

The hydrophilic binder used in the present invention can be any known type, such as a hydrophilic colloid (e.g., gelatin), polyvinyl alcohol, and the like, as are well-known in the art.

The support of the element of the invention can be any of a number of well-known supports for photographic elements. These include polymeric films such as cellulose esters (e.g., cellulose triacetate and diacetate) and polyesters of dibasic aromatic carboxylic acids with divalent alcohols (e.g., poly(ethylene terephthalate)), paper, and polymer-coated paper. Such supports are described in further detail in *Research Disclosure*, December, 1978, Item 17643 [hereinafter referred to as *Research Disclosure*], Section XVII.

The radiation-sensitive layer of the element of the invention can contain any of the known radiation-sensitive materials, such as silver halide, diazo image-forming systems, light-sensitive tellurium-containing compounds, light-sensitive cobalt-containing compounds, and others described in, for example, J. Kosar, Light-Sensitive Systems: Chemistry and Application of Non-silver Halide Photographic Processes, J. Wiley & Sons, N.Y. (1965).

Silver halide is especially preferred as a radiation-sensitive material. Silver halide emulsions can contain, for example, silver bromide, silver chloride, silver iodide, silver chlorobromide, silver chloroiodide, silver bromoiodide, or mixtures thereof. The emulsions can include coarse, medium, or fine silver halide grains bounded by 100, 111, or 110 crystal planes. Silver halide emulsions and their preparation are further described in *Research Disclosure*, Section I. Also useful are tabular grain silver halide emulsions, as described in *Research Disclosure*, January, 1983, Item 22534 and U.S. Pat. No. 4,425,426.

The radiation-sensitive materials described above can be sensitized to a particular wavelength range of radiation, such as the red, blue, or green portions of the visible spectrum, or to other wavelength ranges, such as ultraviolet, infrared, and the like. Sensitization of silver halide can be accomplished with chemical sensitizers such as gold compounds, iridium compounds, or other group VIII metal compounds, or with spectral sensitizing dyes such as cyanine dyes, merocyanine dyes, styryls, or other known spectral sensitizers. Additional information on sensitization of silver halide is described in *Research Disclosure*, Sections I-IV.

The dyes of the invention can be used as interlayer dyes, trimmer dyes, or antihalation dyes. They can be used to prevent crossover in X-ray materials as disclosed in U.S. Pat. Nos. 4,900,652 and 4,803,150 and European Patent Application Publication No. 0 391 405, to prevent unwanted light from reaching a sensitive emulsion layer of a multicolor photographic element as disclosed in U.S. Pat. No. 4,988,611, and for other uses as indicated by the absorbance spectrum of the particular dye. The dyes can be used in a separate filter layer or as an intergrain absorber.

Multicolor photographic elements according to the invention generally comprise a blue-sensitive silver halide layer having a yellow color-forming coupler associated therewith, a green-sensitive layer having a magenta color-forming coupler associated therewith, and a red-sensitive silver halide layer having a cyan color-forming coupler associated therewith. Color photographic elements and color-forming couplers are well-known in the art and are further described in *Research Disclosure*, Section VII.

The element of the invention can also include any of a number of other well-known additives and layers, as described in *Research Disclosure*. These include, for example, optical brighteners, antifoggants, image stabilizers, light-absorbing materials such as filter layers or intergrain absorbers, light-scattering materials, gelatin hardeners, coating aids and various surfactants, overcoat layers, interlayers and barrier layers, antistatic layers, plasticizers and lubricants, matting agents, development inhibitor-releasing couplers, bleach accelerator-releasing couplers, and other additives and layers known in the art.

The dye of formula (I) can be located in any layer of a photographic element where it is desired to absorb light. In a preferred embodiment, the dye is preferably located in a layer where it will be subjected to high pH (i.e., 8 to 12) and/or sulfite during photographic processing, so as to allow the dye to be solubilized and removed or decolorized.

The photographic elements of the invention, when exposed, can be processed to yield an image. During processing, the dye of formula (I) will generally be decolorized and/or removed. Following processing, the dye of the invention should contribute less than 0.10 density unit, and preferably less than 0.02 density unit to the absorbance D-max in the visible region in the minimum density areas of the exposed and processed element.

Processing can be by any type of known photographic processing, as described in *Research Disclosure*, Sections XIX-XXIV, although it preferably includes a high pH (i.e., 8 or above) step utilizing an aqueous sulfite solution in order to maximize decolorization and removal of the dye. A negative image can be developed by color development with a chromogenic developing agent followed by bleaching and fixing. A positive image can be developed by first developing with a non-chromogenic developer, then uniformly fogging the element, and then developing with a chromogenic developer. If the material does not contain a color-forming coupler compound, dye images can be produced by incorporating a coupler in the developer solutions.

Bleaching and fixing can be performed with any of the materials known to be used for that purpose. Bleach baths generally comprise an aqueous solution of an oxidizing agent such as water soluble salts and complexes of iron (III) (e.g., potassium ferricyanide, ferric chloride, ammonium of potassium salts of ferric ethylenediaminetetraacetic acid), water-soluble persulfates (e.g., potassium, sodium, or ammonium persulfate), water-soluble dichromates (e.g., potassium, sodium, and lithium dichromate), and the like. Fixing baths generally comprise an aqueous solution of compounds that form soluble salts with silver ions, such as sodium thiosulfate, ammonium thiosulfate, potassium thiocyanate, sodium thiocyanate, thiourea, and the like.

The invention is further illustrated by the following Examples.

Synthesis of 2-(4-methylsulfonamido)phenyl-1,3-tricyanopropene

A slurry of 59.0 grams (0.248 mol) 4-(methylsulfonamido)benzoylacetonitrile, 41.0 grams (0.62 mol) malononitrile, and 38 grams (0.496 mol) ammonium acetate in 350 ml absolute ethanol was heated to reflux with stirring and held at reflux for two hours. The reaction mixture was cooled to 25° C., poured into 250 ml distilled water, and acidified with 43 ml (0.96 mol) 12M HCl. The resulting precipitate was collected by filtration and washed with water and ehtanol to yield 60.2 grams (85% yield) of product as a tan powder, m.p.=205°-206° C. All analytical data were consistent with the structure.

Synthesis of 3-carbamoyl-1,1-dicyano-2-(4-methylsulfonamido)phenyl prop-1-ene A suspension of 2-(4-methylsulfonamido)phenyl-1,1,3-tricyanoprop-1-ene (2.0 grams, 0.007 mol) in 50 ml concentrated hydrochloric acid solution was heated at 70° C. for 2 hours, then allowed to stir at room temperature for 20 hours. The resulting tan slurry was filtered through a sintered glass funnel yielding 2.1 grams of crude product. The crude product was slurried at reflux for 20 minutes in 20 ml acetonitrile, collected by filtration, then dried to afford 1.95 grams (92% yield) of the amide (m.p.=230° C. dec.) as an off-white powder. All analytical data were consistent with the structure.

Synthesis of 6-methoxy-2-(4-methylsulfonamido)phenyl-1,1,3-tricyanohexatriene Trimethoxypropene (3.0 grams, 0.023 mol) was added in one portion to a stirring solution of 2-(4-methylsulfonamido)phenyl-1,1,3-tricyanoprop-1-ene (5.0 grams, 0.017 mol) in 20 ml acetic anhydride at room temperature. After 20 minutes, the precipitated product was collected by filtration, washed with 20 ml acetic anhydride then dried to afford 3.3 grams (55% yield) of the product as a yellow powder (m.p.=170°-172° C. dec.). All analytical data were consistent with the structure.

Synthesis of Dye 1

A slurry of 5.72 grams (0.02 mol) 2-(4-methylsulfonamidophenyl)-1,1,3-tricyanopropene, 3.13 grams (0.021 mol) 4-dimethylaminobenzaldehyde and 30 ml of glacial acetic acid was heated at 130° C. with constant stirring for 30 minutes. The dark purple product mixture was then allowed to cool to room temperature and stirred at room temperature for 16 hours. The precipitated purple crystalline product was collected by filtration and washed sequentially with ethanol, ether, and ligroin. The weight of dried, crude product was 7.3 grams. The crude dye was purified by slurrying in 50 ml refluxing glacial acetic acid with hot filtration. The collected product was washed with 30 ml glacial acetic acid and dried to afford 5.14 grams (61.5% yield) of pure dye 1, m.p.=224°-225° C. All analytical data were consistent with the structure.

Synthesis of Dye 4

A slurry of 2.37 grams (0.01 mol) 2-(4-carboxyphenyl)-1,1,3-tricyanopropene, 1.93 grams (0.011 mol) 4-dimethylaminocinnamaldehyde and 30 ml of glacial acetic acid was heated at 130° C. for 30 minutes, cooled to room temperature, and allowed to stir at room temperature for 16 hours. The precipitated blue-green product was collected and washed sequentially with glacial acetic acid, ether, and ligroin, then dried. The weight of pure dye 4 was 2.8 grams (70.9% yield), m.p.=250°-255° C. All analytical data were consistent with the dye structure.

Synthesis of Dye 5

To a mixture of 5.6 grams (0.02 mol) 2-(4- methylsulfonamido-1,1,3-tricyanopropene), 1.5 grams (0.015 mol) triethylamine, and 15 ml of ethanol was added with stirring 1.5 grams (0.01 mol) triethylorthoformate. The reaction was stirred at room temperature for 2 minutes then heated to reflux. Held at reflux for 2 minutes then rapidly cooled to room temperature and allowed to stir at room temperature for 30 minutes. The salmon-red crystalline product was collected, washed with ethanol and dried to afford 3.8 grams of crude product. The product was purified by slurrying in ethanol at reflux for one hour, cooling to room temperature, and collecting the crimson crystalline product by filtration. The yield of pure dye 5 was 3.3 grams (48.2% yield), m.p.=232°-234° C. All analytical data were consistent with the structure.

Synthesis of Dye 7

A slurry of 4.74 grams (0.02 mol) 2-(4-carboxyphenyl)-1,1,3-tricyanopropene, 2.64 grams (0.02 mol) trimethoxypropene, 4.4 grams (0.044 mol) triethylamine and 30 ml of ethanol was stirred at room temperature for one hour then heated to reflux for one hour. After allowing to cool to room temperature the product mixture was poured into 500 ml of water and 15 ml of concentrated hydrochloric acid was added. The precipitated blue-black product was collected and recrystallized by dissolving in 100 ml of glacial acetic acid at reflux and slowly cooling to room temperature with constant stirring. The precipitated product was collected and sequentially washed with acetic acid, ether, and ligroin, then dried to afford 3.12 grams (25.5% yield) of pure dye 7 as a bronze-black powder, m.p.=277°-279° C. All analytical data were consistent with the dye structure.

Synthesis of Dye 17

Triethylamine (0.25 grams, 0.0025 mol) was added in one portion to a stirring solution of 6-methoxy-2-phenyl-1,1,3-tricyanohexatriene (0.5 grams, 0.002 mol) and 5-carboxy-2,3-dimethylbenzoxolium p-toluenesulfonate (0.69 grams, 0.002 mol) in 7 ml absolute ethanol. The solution turned deep blue instantaneously upon the addition of triethylamine. The reaction mixture was refluxed for 30 minutes, then allowed to cool to room temperature and stir for 2 hours. The resulting green-blue slurry was filtered, and the collected product was washed with 10 ml absolute ethanol. The crude dye was slurried at reflux in 10 ml absolute ethanol, collected by filtration, then dried to afford 0.55 grams (66% yield) of pure dye 17. All analytical data were consistent with the structure.

Example 1: Dye Wandering and Stain Evaluation

Dyes according to formula (I) were prepared as solid particle dispersions by ball-milling according to the following procedure. Water (21.7 ml) and a 6.7% solution of Triton X-200 ® surfactant (2.65 g) were placed in a 60 ml screw-capped bottle. A 1.00 g sample of dye was added to this solution. Zirconium oxide beads (40 ml, 2 mm diameter) were added and the container with the cap tightly secured was placed in a mill and the contents milled for four days. The container was removed and the contents added to a 12.5% aqueous gelatin (8.0 g) solution. The new mixture was placed on a roller mill for 10 minutes and the resulting mixture was filtered to remove the zirconium oxide beads. The resulting dye dispersion had a particle size mean diameter less than 1.0 μm.

The solid particle dispersions of these dyes were coated on a polyester support according to the following procedure. A spreading agent (surfactant 10G ®) and a hardener (bis(vinylsulfonylmethyl)ether) were added to the dye-gelatin melt prepared as described above. A melt from this mixture was then coated on a poly(ethylene terephthalate) support to achieve a dye coverage of 0.27 g/m$^2$, a gelatin coverage of 1.61 g/m$^2$, a spreading agent level of 0.097 g/m$^2$, and a hardener level of 0.016 g/m$^2$. The absorbance of the dye dispersion was measured with a spectrophotometer. Identical elements were subjected to a 5 minute distilled water wash (2-3 gal/min flow rate), and to Kodak E-6 ® Processing (which is described in *British Journal of Photography Annual*, 1977, pp. 194-97) and the absorbance was measured for each. The results are shown in Table I.

TABLE I

| DYE | λ-max | D-max | D-max after Water Wash | D-max after E-6 ® Processing |
|---|---|---|---|---|
| 1 | 534 nm | 0.90 | 0.90 | 0.00 |
| 4 | 567 nm | 1.40 | 1.37 | 0.00 |
| 5 | 566 nm | 1.41 | 1.49 | 0.00 |
| 9 | 433 nm | 1.45 | 1.46 | 0.00 |
| 15 | 651 nm | 1.48 | 1.49 | 0.04 |
| 16 | 453 nm | 2.52 | 2.67 | 0.00 |
| 17 | 622 nm | 1.49 | 1.49 | 0.04 |
| 20 | 442 nm | 1.10 | 1.06 | 0.00 |
| 21 | 537 nm | 0.94 | 0.94 | 0.00 |

These results show that the dyes of formula (I) are not affected by the water wash, indicating no wandering at coating pH, but are fully solubilized for removal and/or decolorization during photographic processing.

Example 2: Covering Power

Solid particle dispersions of dyes 8, 14, 16, and 20 and comparison dyes A, B, C, D, and E were prepared and coated on a polyester support similarly to the dyes of the invention as described in Example 1. These comparison dyes are analogous to dyes 8, 14, 16, and 20 of the invention, with the substitution of a pyrazolone or benzoylacetonitrile ketomethylene nucleus in place of the tricyanopropene nucleus of dyes 8, 14, 16, and 20, as illustrated below. The absorbance of the dye dispersions were measured with a spectrophotometer, and the covering power (C.P.) was determined for each dye. The covering power of a dye in a solid particle dispersion coating is defined as the optical density at a chosen λmax divided by the coated dye laydown in mg/ft$^2$. For this investigation, the C.P. values of the dyes were compared based on the optical density at their relative λmax's (Dmax). The following results shown in Table II were achieved:

TABLE II

| Dye | Dmax | Dye Coverage (mg/ft$^2$) | C.P. |
|---|---|---|---|
| 8 | 1.2 | 15 | 0.077 |
| A | 0.65 | 12 | 0.054 |
| 14 | 2.1 | 25 | 0.084 |
| B | 1.5 | 25 | 0.060 |
| C | 1.8 | 25 | 0.073 |
| 16 | 2.5 | 25 | 0.100 |
| D | 1.2 | 25 | 0.049 |
| 20 | 1.1 | 25 | 0.044 |
| E | 0.83 | 25 | 0.033 |

The structures of the dyes of Table II are shown below:

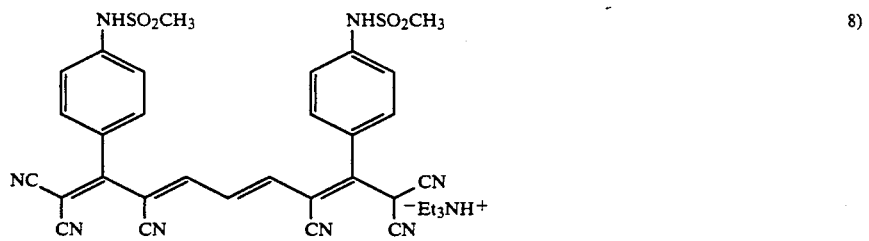

8)

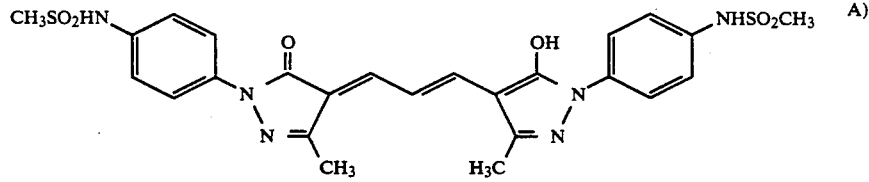

A)

(Dye 67 in U.S. Pat. No. 4,940,654)

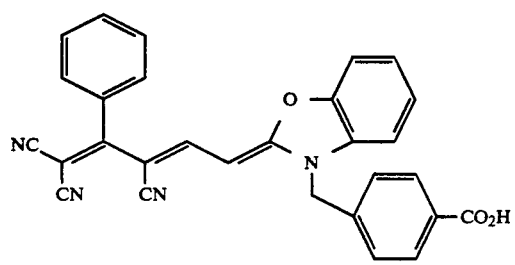

14)

-continued

B)
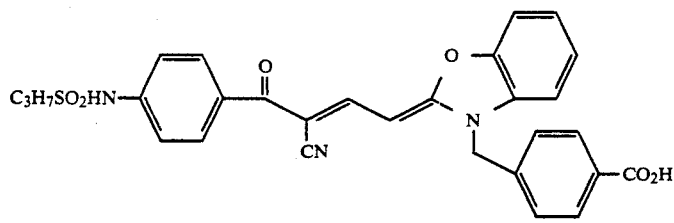
(Dye of type in U.S. Pat. No. 4,900,653)

C)
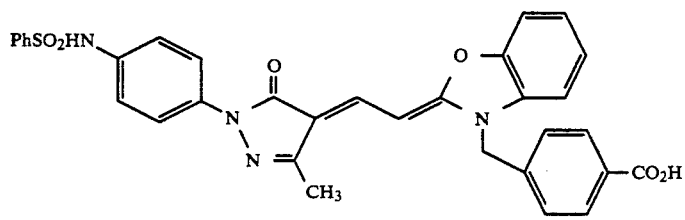
(Dye 7 in U.S. Pat. No. 4,948,718)

16)
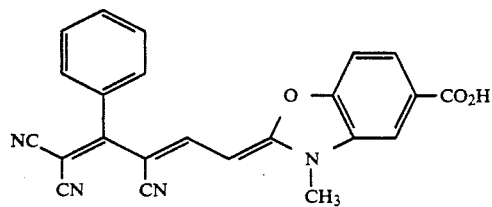

D)
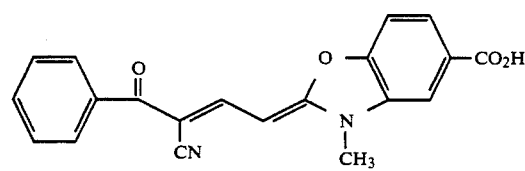
(Dye 7 in U.S. Pat. No. 4,900,653)

20)
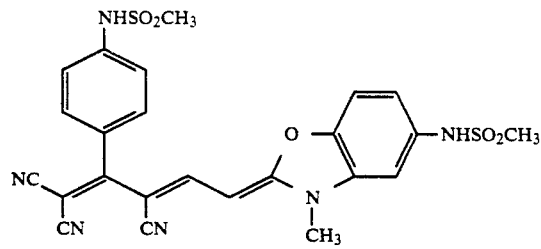

E)
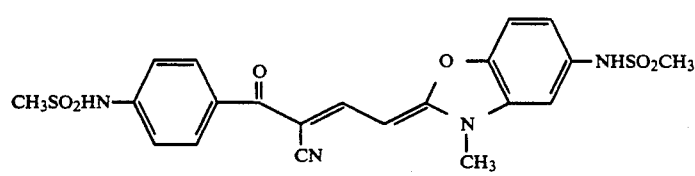
(Dye of type in U.S. Pat. No. 4,900,653)

The above results demonstrates that the dyes of the invention have greater covering power than their prior art analogues.

The invention has been described in detail with reference to preferred embodiments thereof. It should be understood, however, that variations and modifications can be made within the spirit and scope of the invention.

What is claimed is:

1. A photographic element comprising a support having thereon a radiation-sensitive layer and a hydrophilic layer, which is the same as or different from the radiation-sensitive layer, comprising a hydrophilic binder and a filter dye, wherein the filter dye has the formula:

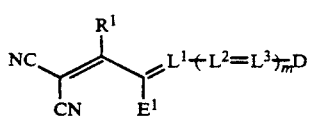

(I)

wherein: D is selected from the group consisting of

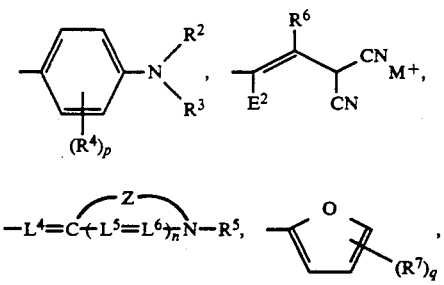

and ketomethylene nuclei;

$E^1$ and $E^2$ are each independently electron withdrawing groups;

$R^1$ and $R^6$ are each independently R or NHR, where R is substituted or unsubstituted aryl;

$R^2$ and $R^3$ are each independently substituted or unsubstituted alkyl or substituted or unsubstituted aryl, or represent the carbon atoms necessary to form a fused ring with the phenyl ring to which the N atom is attached;

$R^4$ and $R^7$ are each independently hydrogen, substituted or unsubstituted alkyl or substituted or unsubstituted aryl;

$R^5$ is substituted or unsubstituted alkyl;

Z represents the atoms necessary to complete a substituted or unsubstituted 5 or 6 membered heterocyclic nucleus;

$M^+$ is a cation;

$L^1$ through $L^7$ are each independently substituted or unsubstituted methine groups;

m is 0, 1, 2, or 3;

n is 0 or 1;

p is 0, 1, 2, 3, or 4;

q is 0, 1, 2, or 3;

and wherein at least one of $R^1$ or D comprises an aryl ring substituted with a carboxy or sulfonamido substituent.

2. A photographic element according to claim 1 wherein at least one of $R^1$ or D comprises an aryl ring substituted with a carboxy substituent.

3. A photographic element according to claim 1 wherein at least one of $R^1$ or D comprises an aryl ring substituted with a sulfonamido substituent.

4. A photographic element according to claim 1 wherein $E^1$ and $E^2$ are selected from the group consisting of cyano, alkylamino, acyl, aminocarbonyl, and alkoxycarbonyl.

5. A photographic element according to claim 1 wherein $E^1$ and $E^2$ are cyano.

6. A photographic element according to claim 1 wherein the filter dye layer is a different layer than the radiation-sensitive layer on the same side of the support as the radiation-sensitive layer.

7. A photographic element according to claim 1 wherein the filter dye layer is a different layer than the radiation-sensitive layer on the opposite side of the support as the radiation-sensitive layer.

8. A photographic element according to claim 1 wherein said dye is in the form of a solid particle dispersion.

9. A photographic element according to claim 8 wherein the dispersion particles have a mean diameter of from, about 0.01 to 10 μm.

10. A photographic element according to claim 8 wherein the filter dye layer is a different layer than the radiation-sensitive layer on the same side of the support as the radiation-sensitive layer.

11. A photographic element according to claim 8 wherein the filter dye layer is a different layer than the radiation-sensitive layer on the opposite side of the support as the radiation-sensitive layer.

* * * * *

UNITED STATES PATENT AND TRADEMARK OFFICE
CERTIFICATE OF CORRECTION

PATENT NO. : 5,213,956
DATED : May 25, 1993
INVENTOR(S) : D.R. Diehl, et. al.

It is certified that error appears in the above-indentified patent and that said Letters Patent is hereby corrected as shown below:

On the Title page, item [57], Abstract, col. 2, line 9, after "withdrawing groups" insert --.--.
line 17, after "$R^5$ is substituted or unsubstituted alkyl" insert --.--
Column 20, line 29, delete "from," and insert --from--.

Signed and Sealed this

Fifteenth Day of March, 1994

Attest:

BRUCE LEHMAN

Attesting Officer    Commissioner of Patents and Trademarks